UNITED STATES PATENT OFFICE.

HOWARD M. SAWYER, OF WEST MEDFORD, MASSACHUSETTS.

IMPROVEMENT IN WATER-PROOF FABRICS, &c.

Specification forming part of Letters Patent No. 172,178, dated January 11, 1876; application filed November 11, 1875.

*To all whom it may concern:*

Be it known that I, HOWARD M. SAWYER, of West Medford, in the county of Middlesex and State of Massachusetts, have invented certain new and useful Improvements in Waterproofing Cloth and Drying Oil, of which the following is a specification:

My invention relates to that class of waterproofing or prepared cloth that is known as oil-cloth; and it consists in a compound for preparing cloth or other goods of like character; and also as a new article of manufacture of oil-cloth prepared with a compound to make it of any desired color, except the usual yellow or oil color and black, as will be hereinafter more fully set forth.

The common or ordinary method of waterproofing or preparing this class of goods is by the use of linseed-oil, litharge, manganese, and red lead, the color always being yellow or oil color, except sometimes black by the use of lamp-black, but never before has any other color been made.

The oil-color is objectionable, from the reason of its heating, sticking, rotting the cotton, and the increased expense of transportation. The same is true of the black with the addition that when exposed to the sun it will absorb and retain the heat.

The compound I use in the manufacture of these goods is composed of the following ingredients, in about the following proportions, viz:

Two hundred gallons linseed-oil, five pounds manganese, ten pounds red lead, and twelve pounds umber are boiled together, after which is added twenty-five pounds sugar of lead, and five pounds white vitriol.

When boiled, the compound is allowed to stand some twelve hours; then the mixture will be a limpid oil, which may be used with lead and zinc and raw oil as a drier.

One gallon of the above preparation to five gallons of raw linseed-oil, sulphur, Paris white, shellac, and the coloring desired, are mixed, and it is then applied to the goods either by dipping or by brush, or by both, after which they are dried in an oven or dry-room. This paint will not turn yellow, and any color may be given to it by adding the coloring desired, preferably excepting black or yellow. Thus I am enabled to distinguish goods manufactured under my present invention from any and all similar goods as now made.

The goods, thus prepared or manufactured, may be used for all water-proof clothing, wagon-covers, tents, awnings, and many other purposes. They do not heat or gather dampness, or become sticky, will wear better, and are perfectly safe, if packed closely in cases and transported to any climate.

Having thus fully described my invention, what I claim as new, and desire to secure by Letters Patent, is—

1. The within-described compound, consisting of linseed-oil, manganese, red lead, umber, sugar of lead, and white vitriol, as a drier, mixed with raw linseed-oil, sulphur, Paris white, shellac, and any desired coloring matter, substantially as and for the purposes set forth.

2. A water-proof fabric, suitable for clothing, tents, wagon-covers, awnings, or similar goods, composed of cotton cloth and a dry non-adhesive compound or preparation made of oil, treated with oxides, earths, and salts, substantially as and for the purposes set forth.

In testimony that I claim the foregoing as my own I affix my signature in presence of two witnesses.

HOWARD M. SAWYER.

Witnesses:
EDWIN A. HILL,
J. H. TYLER.